United States Patent [19]
Ahlstone

[11] 4,124,230
[45] Nov. 7, 1978

[54] RIGID PIPE CONNECTOR WITH LOCKING SCREWS AND METHOD OF MAKING THE SAME

[75] Inventor: Arthur G. Ahlstone, Ventura, Calif.

[73] Assignee: Vetco, Inc., Ventura, Calif.

[21] Appl. No.: 793,497

[22] Filed: May 4, 1977

[51] Int. Cl.² .............................................. F16L 35/00
[52] U.S. Cl. ...................................... 285/18; 285/381; 285/354; 285/356; 285/363; 29/446; 29/525
[58] Field of Search ...................... 285/18, 381, 90, 91, 285/305, 321, 89, 81, 82, 405, 382, 382.4, 39, 308, 309, 354, 404, 363, 388, 386, 356, 357; 403/15; 29/421 R, 427, 446, 525, 526, 157 R

[56] References Cited

U.S. PATENT DOCUMENTS

| | | | |
|---|---|---|---|
| 1,307,540 | 6/1919 | Dohner | 285/354 X |
| 2,457,648 | 12/1948 | Donner | 285/354 X |
| 2,671,949 | 3/1954 | Welton | 29/446 |
| 3,114,566 | 12/1963 | Coberly et al. | 29/446 X |
| 3,240,513 | 3/1966 | Turzillo | 285/90 |

FOREIGN PATENT DOCUMENTS 1,063,620  5/1964  France ..................................... 285/354

Primary Examiner—Werner H. Schroeder
Assistant Examiner—C. J. Arbes
Attorney, Agent, or Firm—Bernard Kriegel

[57] ABSTRACT

A pipe connector has a pin initially stabbed into a box, the pin and box then being axially loaded together at confronting transverse surfaces while the pin and box are pressurized to expand the box and compress the pin, so that when the pressure is relieved a pressure energized shrink fit is provided and the connector is rendered rigid to enhance tensile, compressive and bending strength and provide a fluid tight joint useful in making up lengths of pipe such as piles and pipelines. Locking screws hold the connector against axial separation to maintain the pin under axial compression and maintain the box under axial tension. The lock screws are threaded into the upper end of the box to fasten the pin to the box or a sleeve or gland nut can be threaded on one of the pins and the box and engage a locking shoulder on the other of the pin and the box.

12 Claims, 6 Drawing Figures

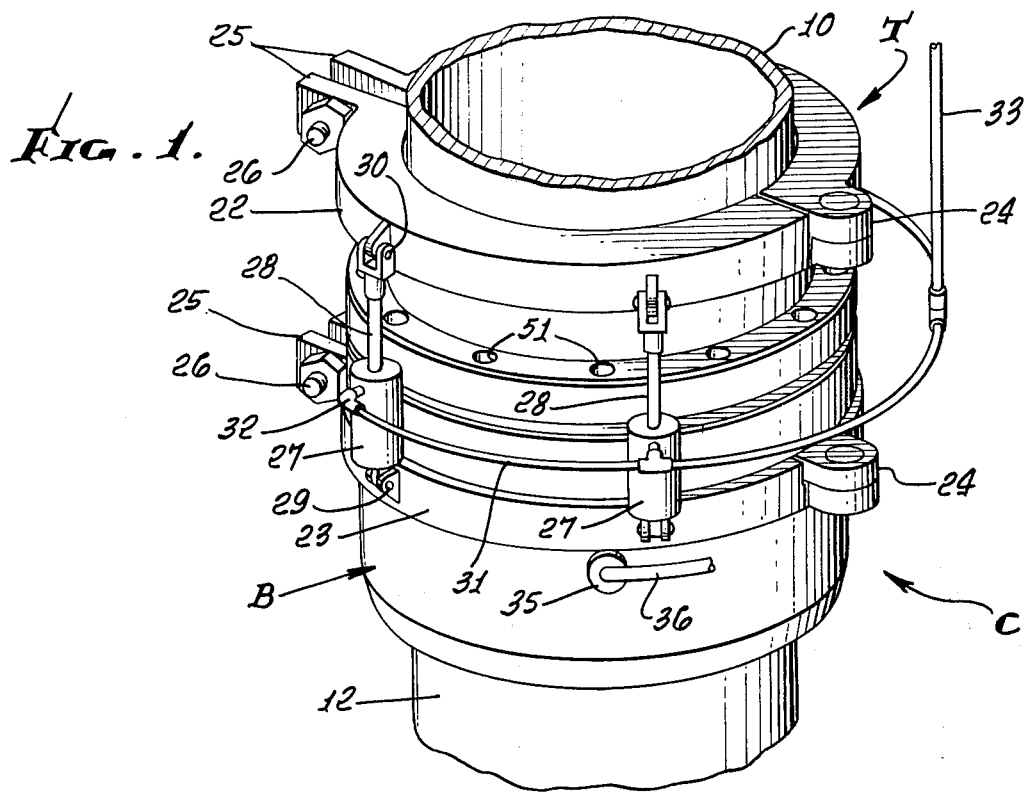
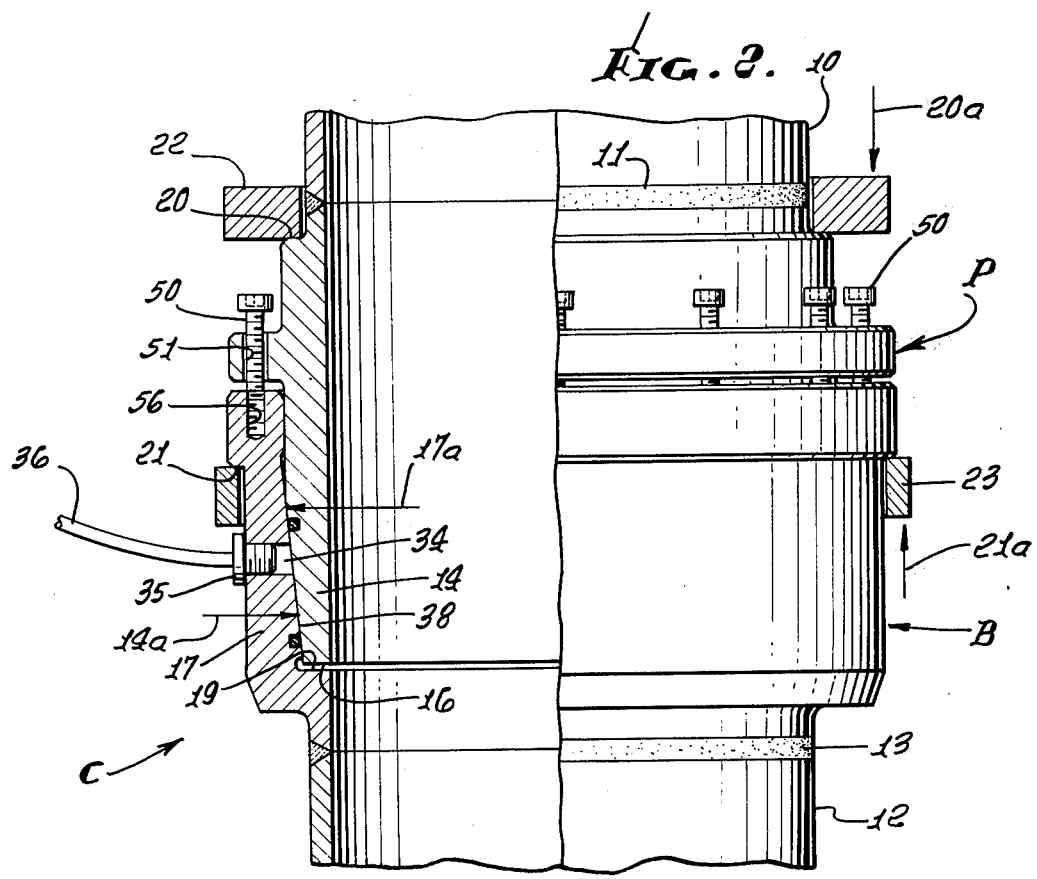

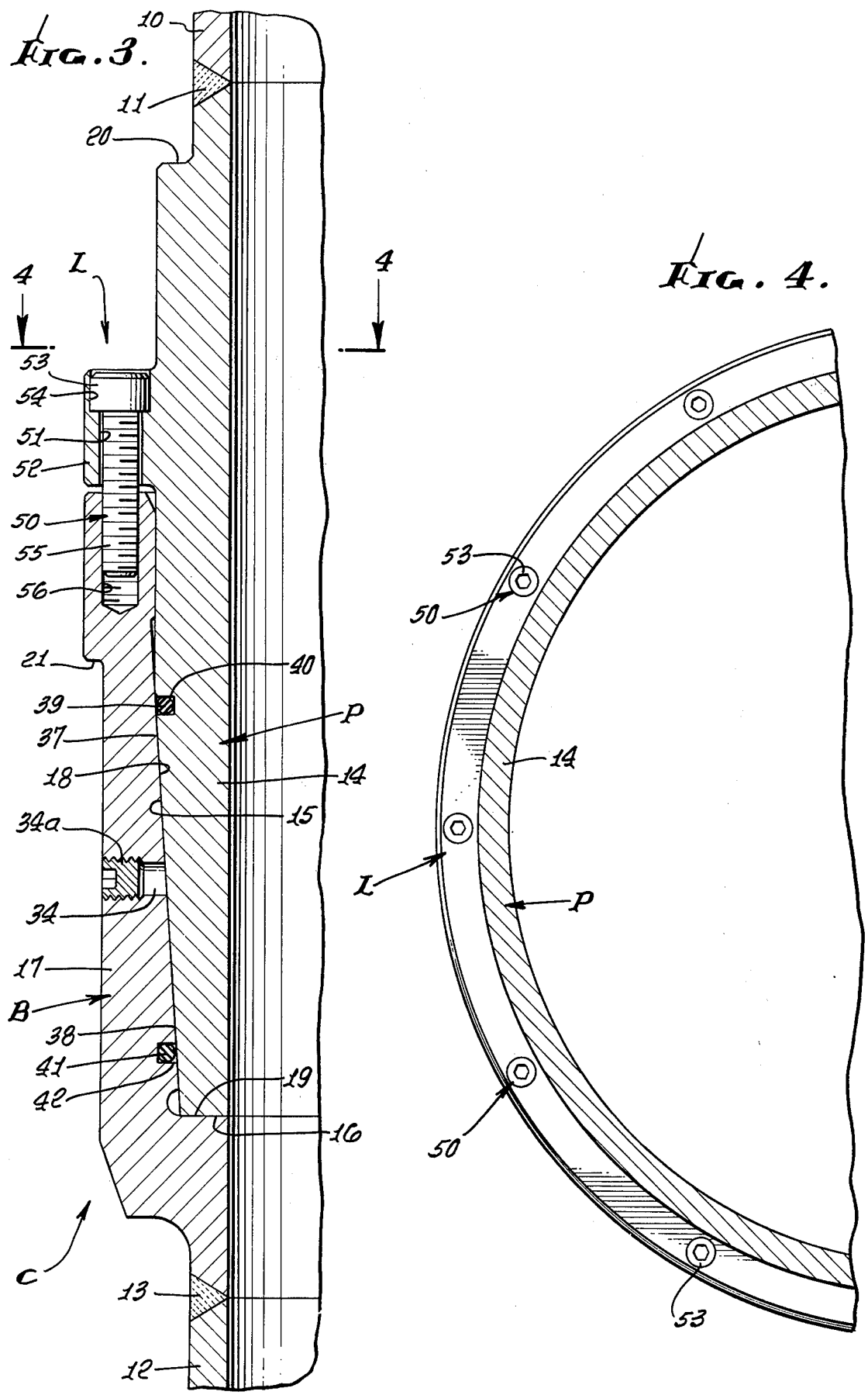

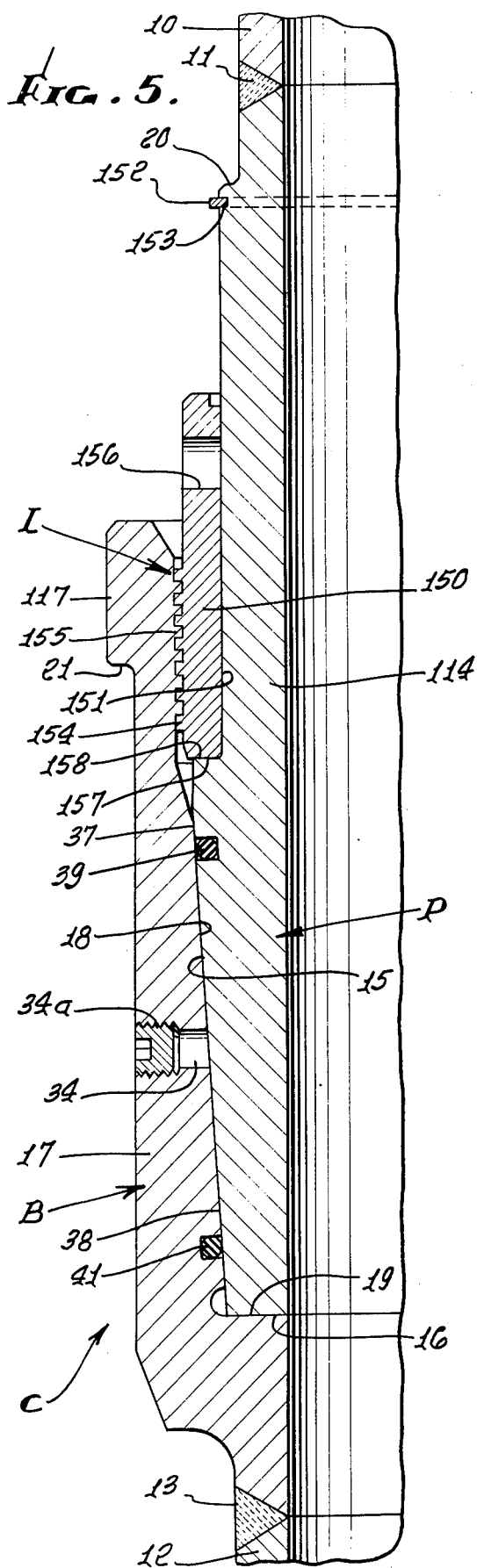
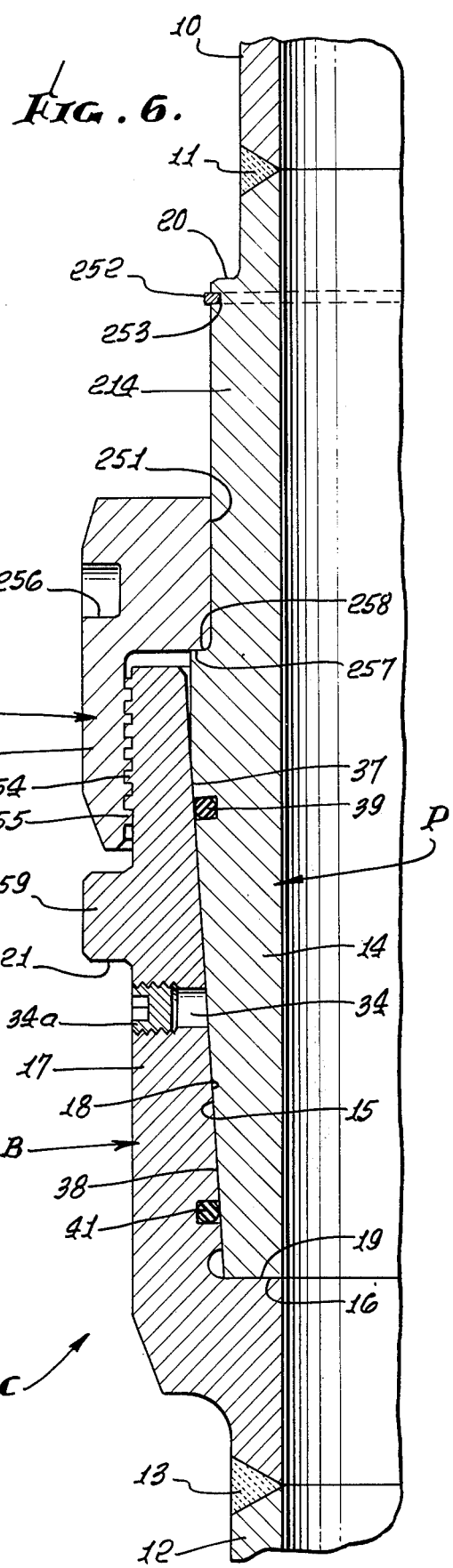

RIGID PIPE CONNECTOR WITH LOCKING SCREWS AND METHOD OF MAKING THE SAME

Heretofore, it has been known that pipe joints or connections may be made up with an interference fit between the pin and the box, by applying fluid pressure between the opposing threaded portions of the pin and the box while the joint parts are rotated to cause the pin and box to shoulder, thereby avoiding the necessity for heating the joint parts to effect a shrink fit. For example, reference may be had to U.S. Pat. No. 2,671,949, granted Mar. 16, 1954, in the name of R. L. Welton, for "Method of Making Tool Joints".

It is also known that pipe line connectors or pile connectors of relatively large diameter can be improved in terms of strength and resistance to separation due to rebound during pile driving operations, if the pin and box are provided with confronting shoulders which are loaded into axial compressive engagement. For example, reference is made to the pending application for U.S. Pat. Ser. No. 712,491, filed Aug. 9, 1976, in the name of L. E. Reimert, for "Rigid Connector And Piling".

In the pending application of Martin B. Jansen, Jr., Ser. No. 742,072, filed Nov. 5, 1976, there is disclosed a threaded connector for a pipe string, such as a production riser used in connection with sub aqueous wells, in which the threaded connection between the pin member and the box member of the connector is made up initially through an application of relatively low torque to the members, afterwhich the connector has a straight line pretensioning force of a high tensile value applied to it through use of a suitable tool, the high pretensioned force being retained between the mating threads of the pin and box member by a preload reaction member threaded on the pin member and rotated into solid engagement with the box while the pretensioned force is being applied, to lock the preload and the connector between the threads.

In the laying of pipelines, such as offshore pipelines, the joints of pipe are commonly welded, usually on lay barges having work stations for horizontally lining up lengths of pipe, welding the joints, grinding the joints, and subsequent inspection and coating. Such lay barges are very costly, even when used for laying relatively small pipelines in shallow water, and range upwardly, when used for laying larger pipelines offshore.

At the present time, such lay barges may cost up to $350,000.00 per day. When greater water depths are encountered, horizontal pipeline laying becomes impractical, but vertical pipeline installation from semi-submersible rigs constitutes a practical and relatively economical pipeline installation procedure. Welding of the joints or connections is generally preferred, since most connectors are not rigid or are not locked up and must generally be stabbed at a batter angle while the mating joint parts are controlled during makeup by elaborate devices.

There is, accordingly, a need for connectors for pipeline connections and pile connections which can be made up vertically, or with the pipe at a batter angle, say while supported and handled by equipment such as that present on drilling rigs or semi-submersible drilling rigs, which connectors are durable, safe, easy to make up and have pressure resistance, tensile, compression and bending strength characteristics in excess of such characteristics of the pipe body.

The present invention satisfies the need for such connectors by providing a rigid, stab-type connector or pin and box joint which is pre-loaded together axially to force opposed transverse pin and box surfaces into compressive engagement, while the pin and box are subjected to pressure between their confronting or companion interfitting surfaces, to expand the box and compress the pin radially. When the pressure is relieved, the connector is rigid, has an interference fit and is axially pre-loaded so as to have bearing contact for pile driving which resists axial separation due to rebound effects, and has superior tensile, compression, bending and pressure capability, exceeding that of the pipe joined by the connector. Such joints are, therefore, idealy suited for, but not limited to, use in marine piles and pipelines.

In accomplishing the foregoing, the connector has a box section having an internal transverse surface or shoulder and is adapted to have a pin section inserted therein with the inner transverse end surface of the pin disposed for abutting engagement with the shoulder in the box. Axially spaced companion tapered metal sealing surfaces in the box and on the pin are coengaged, and if desired supplemental ring seals may be provided between the metal-to-metal sealing surfaces. The box has a pressure fitting enabling fluid to be supplied under pressure between the pin and box within the region spanned by the sealing portions to pressure energize the box and pin and effect resilient expansion of the box and contraction of the pin, while a pre-load tool is applied to opposing radial shoulders or tool engaging projections on the box and on the pin. Actuation of the tool enables the connector to be finally or fully made up with a predetermined compressive load on the coengaged box and pin transverse surfaces or shoulders, with the box under tension and the pin under compression, and when the energizing pressure on the box and pin is then released, while the parts are held in the pre-loaded condition by the pre-load tool, the box contracts and the pin expands to provide an interference or shrink fit interlocking the connector parts together in their pre-loaded condition.

As disclosed in my companion application, Ser. No. 793,496, filed May 4, 1977, for "Rigid Connector for Pipe and Method of Making the Same", the box and pin are held in the preloaded condition by the interference fit of opposed tapered surfaces and including in some forms, locking means, shown as threads or ribs, which prevent axial separation of the pin and box or relaxation of the compressive pre-load, even during rebound when the connector is used in a pile subjected to the blows of a pile driver. The tapered metal-to-metal sealing surfaces prevent leakage from or into the joint and the combination of the axial preload, and the pressure energized fit provides a connector having the advantageous characteristics described above.

According to the present invention, locking means coact between the upper end of the tapered pin section and the upper or free end of the tapered box section to hold the confronting, axially pre-loaded shoulders together, with the pin in compression and the box in tension, whereby the connector maintains its rigidity. The locking means, in one form, comprises screw means or a series of screw fasteners extending through a flange on the pin above the upper end of the box and threaded into the upper end of the box, thereby holding the pin in compression, and the box in tension, when the loading tool is removed and the energizing fluid pressure is relieved. In other forms, the screw means comprises a threaded sleeve or a nut threadedly engaged with one of the pin and the box and shouldered against the other of the pin and the box to hold the pin in compression and the box in tension.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense.

Referring to the drawings:

FIG. 1 is a perspective illustrating a pipe and a connector during assembly and in a clamping tool for axially loading the connector while it is pressurized;

FIG. 2 is a partial elevation and partial longitudinal section of one form of pipe connector, with the clamping tool broken away, and showing the connector parts stabbed together prior to final make up;

FIG. 3 is an enlarged fragmentary longitudinal section of the pipe connector of FIG. 2 in a fully made up condition;

FIG. 4 is a fragmentary horizontal section, on a reduced scale, as taken on the line 4—4 of FIG. 3;

FIG. 5 is an enlarged fragmentary longitudinal section showing another form of rigid pipe connector; and FIG. 6 is an enlarged fragmentary longitudinal section showing still another form of rigid pipe connector.

As seen in the drawings, a pipe connector C made in accordance with the invention, comprises an upper pin section P and a lower box section B adapted to interconnect pipe lengths, including an upper pipe section 10, secured by a circumferentially continuous weld 11 to the upper end of the pin P, and a lower pipe section 12, secured by a circumferentially continuous weld 13 to the lower end of the box section B. The connector C is shown and will be described as one wherein the connection is stabbed together by insertion of the downwardly extending pin into the upwardly facing box. It should be understood, however, that in the case of some uses of the connector, this relationship of pin to box may be reversed and the box moved over the pin. Preferably, the inner, upper end of the box B is outwardly flared to facilitate stabbing of the pin into the box, and the tapered form of the parts progressively aligns the parts, as the pin moves into the box. The taper angle is preferably a locking angle.

The pin section P includes a circular body section 14 having an external downwardly tapering surface 15 and a lower end surface 16 which extends transversely of the pin body 14. The box section B comprises a circular body section 17 having an internal downwardly tapered surface 18 complemental to the tapered surface 15 of the pin body, whereby when the pin body is inserted or stabbed into the box, the complemental tapered surfaces 15 and 18 are disposed in confronting coengagement. The box body 17 also includes an inner lower transversly extended shoulder or surface 19 against which the pin surface 16 abuts when the connector is made up. The strength of such joints, as thus far described, in terms of resistance to axial separation or tensile strength, compressive and bending strength, as well as the ability of the connector to withstand fluid pressure, both from within and from without, is dependent upon the extent to which the confronting transverse surfaces 16 and 19 are axially preloaded and the extent to which there is a tight interference fit between the confronting tapered surfaces 15 and 18 of the respective pin and box members.

The present invention provides a joint of superior strength characteristics by reason of the fact that the pin and box sections of the joint or connector are made up in a novel manner. In the vicinity of the upper end of the pin body 14, it is provided with a radially extended, upwardly facing, thrust or pre-load shoulder 20, and adjacent the upper end of the box body 17, it is provided with an external radially outwardly projecting, downwardly facing, thrust shoulder 21. These thrust or preload shoulders 20 and 21 are adapted to provide means engageable by a suitable makeup or loading tool T, whereby as indicated by the respective arrows 20a and 21a in FIG. 2, a compressive axial force can be applied to the pin body 14 to load the pin end 16 against the inner box surface 19 while the box body 17 is under tension.

The tool T may be of any suitable form to provide opposing forces as represented by the arrows 20a and 21a, and as illustrated in FIG. 1, such a tool may comprise an upper ring 22 and a lower ring 23, each of the rings 22 and 23 having suitable hinge means 24 hingedly interconnecting ring half parts together so that the ring may be opened for lateral application about the pipe and about the connector. Each ring 22 and 23 also is provided with suitable means, such as outstanding ears 25, at the free ends of the ring half parts, and adapted to receive bolts 26 whereby the rings 22 and 23 may be assembled and secured about the pipe and connector for engagement with the respective thrust shoulders 20 and 21 on the pin and on the box. Means are provided for pulling the rings 22 and 23 axially towards one another, when the rings are disposed about the pipe and connector, so as to apply the opposite forces referred to above. As shown, the pulling means comprises a suitable number of circumferentially spaced hydraulic cylinders 27 having rods 28 projecting therefrom, with the respective cylinders connected to one of the rings as at 29 and the rods connected to the other of the rings as at 30. A hydraulic line 31 is adapted through suitable fittings 32 to supply hydraulic fluid under pressure to the cylinders 27 from a source conduit 33 which is connected to the conduit 31 and to a suitable fluid pressure source (not shown). Thus, when hydraulic fluid is supplied to the cylinders 27 to retract the rods 28 and force the rings 22 and 23 towards one another, the pin and box bodies 14 and 17 can be axially preloaded.

In addition, as mentioned above, the strength of the connector is also dependent upon the interference fit between the opposing tapered pin surface 15 and box surface 18. Accordingly, the box body 17 is provided with at least one radial pressure port 34 threaded to receive a connector fitting 35 for a hydraulic line 36, whereby fluid under pressure can be supplied between the confronting tapered surfaces 15 and 18 of the pin and box between an upper opposed sealing region 37 and a lower opposed sealing region 38 between the tapered pin and box surfaces. The sealing effectiveness of the upper and lower tapered, metal-to-metal sealing regions 37 and 38 may be enhanced by the provision of an upper, annular and resilient sealing ring 39 disposed in a groove 40 in the pin or the box body and a lower, annular and resilient sealing ring 41 disposed in a groove 42 in the pin or the box body, the sealing rings 39 and 41 being sealingly engaged with the opposed tapered surfaces of the respective members.

As seen in FIG. 2, and somewhat exaggerated, when the pin P is stabbed into the box B to the extent that a seal is provided at the upper and lower sealing regions 37 and 38 therebetween, the lower end 16 of the pin P is not fully axially loaded against the confronting box shoulder 19, and as previously indicated, such loading is accomplished in response to the application of the opposing forces by the loading tool T. During the operation of the tool T to axially pre-load the connector, hydraulic fluid under pressure is admitted through the port 34, between the upper and lower sealing regions 37 and 38, sufficient to apply substantial circumferential compressive force to the pin body 14, as indicated by the arrow 14a in FIG. 2, and substantial expansive force, as indicated by the arrow 17a, to the body 17 of the box.

The connector is finally made up while the fluid pressure is maintained, by actuation of the tool T to axially load the confronting pin and box surfaces 16 and 19, while the pin body 14 is under compression and the box body 17 is under tension. Accordingly, when the fluid pressure is relieved there will be effected a pressure energized interference fit between the tapered pin surface 15 and box surface 18, while the confronting transverse surfaces 16 and 19 of the pin and box are in an axially preloaded condition. As a result, the completed joint or connector, as seen in FIG. 3, will have superior strength characteristics in terms of tensile, compressive and bending strength and a fluid tight joint is provided which is useful in making up lengths of pipe such as piles and pipelines.

When the hydraulic line connector 35 has been removed from the pressure port 34, it is preferred that the port 34 be plugged by a suitable screw plug 34a as seen in FIG. 3.

Such a connection of pipe sections 10 and 12 can be easily and quickly made with the usual pipe handling equipment found on drilling barges and the like and with the pipe sections disposed vertically or at batter angles while being initially stabbed together and the making up of the connection can be accomplished more quickly than welded connections have been heretofore made. Thus, the invention not only provides a strong and durable connection which can withstand the severe service of subsea pipelines and piles, but economies are effected in terms of the speed with which the connections can be made up utilizing the very expensive rig or barge equipment.

The present invention involves locking means L cooperably engageable between the pin and the box in such a manner that the pin body section 14 is held compressively with its end surface 16 engaged with the opposing shoulder 19 of the box, and with the box body section 17 held in tension, while the tapered pin and box surfaces are coengaged by the pressure energized shrink fit, upon the relief of the pressure fluid from the region between the opposed metal-to-metal sealing sections 37 and 38.

Referring to FIG. 3, the made up connection C is better illustrated on an enlarged scale. In this form, the locking means L comprises locking elements 50 carried by the pin P and adapted to engage the box B when the opposing transverse pin and box surfaces 16 and 19 are fully loaded together by the loading tool T. More specifically, the locking elements 50 comprise a series of circumferentially spaced cap screws or threaded fasteners extending through bores 51 which are spaced circumferentially about an angular flange 52 projecting outwardly from the body section 14 of the pin P, above the upper, open end of the body 17 of the box B. The heads 53 of the cap screws or socket headed screws 50 are disposed in recesses 54, at the bottom of which the heads shoulder against the flange 52, with the screw stem 55 threadedly extended into the threaded bore 56 in the upper end of the box body 17. During stabbing of the pin into the box, the screws 50 may be kept aside, until alignment of the holes 51 in the flange 52 with the threaded bores 56 in the box is established. Orientation of the pin and box to effect such alignment may be accomplished in any convenient manner, visual or mechanical, such as by the use of an orienting pin and cam means (not shown) or suitable tapered pins (also not shown) threaded into the box and projecting through holes in the flange. The fasteners can them be installed freely and loosely.

While the axial preloading force is applied to the thrust shoulders 20 and 21, as previously described, and while pressure fluid is applied to the tapered joint between the upper and lower sealing regions 37 and 38, the fasteners 50 are progressively tightened down by a suitable tool or driver. When the preloading tool T is removed, and the fluid pressure relieved from between the tapered connector members, the fasteners 50 will hold the pin in compression, with the inner extremity 16 thereof engaged with the opposing internal shoulder 19 at the box, and the body section 17 of the box will be held in tension, thereby preventing separation of the connector and assuring its tensile and bending strength due to the maintenance of the axially loaded and pressure energized interference fit between the pin and box.

Referring to FIG. 5 another form of threaded locking element 150 is interengaged between the pin P and the box B to hold the pin in compression and the box in tension. In this form, the threaded locking element 150 is an externally threaded sleeve having a bore 151 through which an upwardly extended body section 114 of the pin body 14 slidably extends. The upwardly facing thrust shoulder 20 is at the top of the upwardly extended body section 114, and below the thrust shoulder 20, the pin body section 114 has a split stop ring 152 disposed within an annular groove 153 formed in the pin body section 114 and constituting means for limiting axial displacement of the threaded sleeve 150 from the pin body section 114, when the pin is being welded to the pipe.

The threaded sleeve 150 has an external square or acme thread 154 cooperatively engaged with a companion square or acme thread 155 formed within the upper end extension 117 of the box body 17. When the connector parts are being stabbed together, the threaded sleeve 150 will be initially displaced upwardly along the cylindrical upper pin body extension 114, allowing the tapered pin body surface 15 to engage within the tapered box body surface 18 to effect a seal at the upper and lower sealing regions 37 and 38. Thereafter, when the loading tool T has been applied to the thrust shoulders 20 and 21 and the connection axially preloaded, as fluid pressure is supplied through the port 34, the threaded sleeve can be rotated to effect threaded engagement between the companion threads 154 and 155, by a suitable spanner or other tool engageable within one or a plurality of tool receiving openings 156 formed in the threaded sleeve 150. The lower transverse end surface 157 of the threaded sleeve 150, responsive to rotation of the threaded sleeve, will abut with a radially outwardly projecting shoulder 158 formed on the pin body section 14 above the upper sealing region 37 and facing outwardly of the box. The threaded sleeve 150 is cinched down tightly to maintain axial compressive loading of the lower end surface 16 of the pin body against the upwardly facing shoulder 19 provided within the box. Thus, when the loading tool T is removed and the fluid pressure relieved from the region between the upper and lower seal regions 37 and 38, the connector is held tightly together to maintain the rigidity resulting from the axial preload and the pressure energized interference fit.

As seen in FIG. 6, the threaded locking element 250 is in the form of a bonnet, the body of which has a bore 251 slidably disposed on the cylindrical upper body extension 214 of the pin P. Below the thrust shoulder 20, on the upper pin body extension 214, is a split stop ring 252 installed in a circumferentially extended groove 253 to limit upward displacement of the bonnet 250 from the body extension 214. The downwardly facing thrust shoulder 21 on the pin body 17 is formed on a flange 259 projecting outwardly from the box body, and above this flange 249, the box body is provided with an external square or acme thread 254 adapted to receive the companion internal square or acme thread 255 provided within the lower skirt of the bonnet 250. The body of the bonnet has suitable spanner wrench or other tool engaging recesses 256 provided therein, whereby the bonnet can be rotated into threaded engagement with the box, while the pin and box are held in compression and tension by the forces applied by the loading tool T and while the pressure fluid is applied between the upper and lower sealing regions 37 and 38, as previously described. With the pin and box held in the preloaded and pressure energized condition, the bonnet can be rotated to engage the threads to engage the downwardly facing, inner peripheral portion or shoulder 257 on the bonnet body with an upwardly facing circumferentially extended shoulder 258 on the pin body above the upper sealing region 37. When the bonnet 250 is tightly cinched down, the loading tool T can be removed and pressure fluid relieved, and the connector will be held against axial separation with the pin body in compression between the bonnet and the upwardly facing box shoulder 19 which is engaged by the lower transverse surface 16 of the pin and with the box in tension.

From the foregoing it will now be apparent that the present invention provides a pipe connector for use in making up lengths of pipe such as piles and pipelines wherein the pressure energization of the interference fit between the tapered pin and box members and the axial preloading of the pin P against the inner shoulder of the box while the box is held in tension results in the production of a rigidized pipe joint of superior strength and durability and which can be readily and quickly made up utilizing the usual pipe handling and supporting equipment provided on drilling rigs and barges and with the pipe sections disposed vertically or at some batter angle.

I claim:

1. A lockable rigid pipe connector comprising: a pin and a box; said pin having an externally tapered section and a transverse make up shoulder; said box having an internally tapered body section to receive the tapered section of said pin and having an inner transverse make up shoulder confronting said pin make up shoulder; said pin section and said box section having therebetween axially spaced companion tapered sealing portions; said box section having port means between said sealing portions for admission therebetween of a pressure fluid acting to circumferentially expand said box section and compress said pin section; and means on said pin and box engageable by a loading tool for axially relatively forcing said sections and compressively loading said make up shoulders while said pressure fluid is acting on said sections; said pin and box sections being held against axial separation with said make up shoulders in compression and said box section in tension by a pressure energized shrink fit between said pin section and said box section upon relief of said pressure fluid; and locking means coacting between said pin and box to hold said pin in compression and said box in tension including an axially extended portion of said pin section projecting from the open end of said box section, and screw means coengaged between said axially extended portion of said pin section and said end of said box section.

2. A rigid pipe connector as defined in claim 1; one of said pin and box sections having a locking shoulder, said screw means engaging said locking shoulder and being threadedly connected to the other of said pin and box sections.

3. A rigid pipe connector as defined in claim 1; said pin section having a locking shoulder thereon facing outwardly with respect to said box section, said screw means engaging said locking shoulder and being threadedly connected to said end of said box section.

4. A rigid pipe connector as defined in claim 1; said axially extended portion of said pin section having a circumferentially extended flange projecting outwardly to oppose said end of said box section, said screw means including a series of screw fasteners shouldered on said flange in circumferentially spaced relation and threadedly engaged in said end of said box section.

5. A rigid pipe connector as defined in claim 1; said axially extended portion of said pin section being cylindrical, said pin section having a locking shoulder facing outwardly of said box section, said screw means comprising a screw member rotatable about said cylindrical pin section and engageable with said locking shoulder, said screw member and said end of said box section having threaded coengagement.

6. A rigid pipe connector as defined in claim 1; said axially extended portion of said pin section being cylindrical, said pin section having a locking shoulder facing outwardly of said box section, said screw means comprising a screw member rotatable about said cylindrical pin section and engageable with said locking shoulder, said screw member being an externally threaded sleeve, said end of said box having an internal thread complemental to the thread on said sleeve.

7. A rigid pipe connector as defined in claim 1; said axially extended portion of said pin section being cylindrical, said pin section having a locking shoulder facing outwardly of said box section, said screw means comprising a screw member rotatable about said cylindrical pin section and engageable with said locking shoulder, said screw member being an internally threaded bonnet, said end of said box having an external thread complemental to the thread in said bonnet.

8. A rigid pipe connector as defined in claim 1; said axially extended portion of said pin section being cylindrical, said pin section having a locking shoulder facing outwardly of said box section, said screw means comprising a screw member rotatable about said cylindrical pin section and engageable with said locking shoulder, said screw member being an externally threaded sleeve, said end of said box having an internal thread complemental to the thread on said sleeve, and stop means on said axially extended portion of said pin for preventing axial separation of said sleeve from said axially extended portion but allowing axial movement of said sleeve on said axially extended portion upon stabbing of said pin and box together.

9. A rigid pipe connector as defined in claim 1; said axially extended portion of said pin section being cylindrical, said pin section having a locking shoulder facing outwardly of said box section, said screw means comprising a screw member rotatable about said cylindrical pin section and engageable with said locking shoulder, said screw member being an internally threaded bonnet, said end of said box having an external thread complemental to the thread on said bonnet, and stop means on said axially extended portion of said pin for preventing axial separation of said bonnet from said axially extended portion but allowing axial movement of said bonnet on said axially extended portion upon stabbing of said pin and box together.

10. The method of making rigid pipe connections comprising: axially coengaging tapered pin and tapered box connector parts and disposing opposing axially spaced sealing portions thereof in opposing initial confronting relation, compressively loading said makeup shoulders together by applying opposite axial forces to said pin and box placing said pin in compression and said box in tension while circumferentially expanding said box and compressing said pin by the application of pressure fluid therebetween between said sealing portions thereof, locking said pin and box together with said pin in compression and said box in tension by making up a threaded interlock between the open end of said box and a locking shoulder on said pin facing outwardly with respect to said end of said box, and then relieving said pressure fluid to allow shrinking of said box and expansion of said pin into interlocking relation with said pin and box respectively held in axial compression and tension by said threaded interlock.

11. The method of claim 10; wherein said threaded interlock is made by tightening a plurality of threaded fasteners extending through a flange on said pin into threaded openings in the end of said box.

12. The method of claim 10; wherein said threaded interlock is made by tightening a threaded member threadedly connected to said end of said box against said locking shoulder.

* * * * *